US009180732B2

(12) United States Patent
Endicott

(10) Patent No.: US 9,180,732 B2
(45) Date of Patent: Nov. 10, 2015

(54) NON-PNEUMATIC WHEEL ASSEMBLY WITH REMOVABLE HUB

(75) Inventor: James Endicott, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 537 days.

(21) Appl. No.: 13/391,198

(22) PCT Filed: Aug. 28, 2009

(86) PCT No.: PCT/US2009/055278
§ 371 (c)(1),
(2), (4) Date: Feb. 17, 2012

(87) PCT Pub. No.: WO2011/025491
PCT Pub. Date: Mar. 3, 2011

(65) Prior Publication Data
US 2012/0205017 A1     Aug. 16, 2012

(51) Int. Cl.
*B60B 9/14* (2006.01)
*B60B 9/04* (2006.01)
*B60B 1/02* (2006.01)
*B60B 1/04* (2006.01)
B60B 21/06 (2006.01)

(52) U.S. Cl.
CPC .............. *B60B 9/14* (2013.01); *B60B 1/0223* (2013.01); *B60B 1/0261* (2013.01); *B60B 1/042* (2013.01); *B60B 9/04* (2013.01); *B60B 21/06* (2013.01)

(58) Field of Classification Search
CPC .............. B60B 9/00; B60B 9/02; B60B 9/04; B60B 9/10; B60B 9/14; B60B 1/0261; B60B 1/0223; B60B 1/042; B60B 21/06
USPC ................. 152/1, 5, 7, 11, 12, 246, 270, 375, 152/379.3; 301/86, 87
See application file for complete search history.

(56) References Cited

U.S. PATENT DOCUMENTS

| 830,083 | A | * | 9/1906 | Kopperud | ....................... 152/12 |
| 1,021,440 | A | * | 3/1912 | Arnold et al. | ................... 152/84 |
| 1,098,028 | A | * | 5/1914 | Fahrney | .......................... 152/12 |
| 1,249,273 | A | * | 12/1917 | Bohannon | ....................... 152/85 |
| 2,140,431 | A | * | 12/1938 | Morphew | ........................ 152/86 |
| 5,050,656 | A | | 9/1991 | Ho | |
| 6,244,669 | B1 | * | 6/2001 | Braunschweiler | .............. 301/84 |

(Continued)

FOREIGN PATENT DOCUMENTS

| GB | 171567 | A | * | 11/1921 |
| JP | 03248901 | A | * | 11/1991 |

OTHER PUBLICATIONS

International Search Report and Written Opinion for PCT/US2009/055278 dated Nov. 3, 2009.

*Primary Examiner* — Kip T Kotter
(74) *Attorney, Agent, or Firm* — John Steckler Schwab

(57) ABSTRACT

A non-pneumatic wheel assembly is provided. More particularly, a non-pneumatic wheel assembly is provided having a removable hub i.e., a hub that may be separated from the remainder of the wheel assembly. The hub may be reused and other portions of the non-pneumatic wheel assembly replaced as needed. In addition, the hub may be constructed from a different material than used for other portions of the non-pneumatic wheel.

5 Claims, 8 Drawing Sheets

(56) References Cited

U.S. PATENT DOCUMENTS

| | | |
|---|---|---|
| 6,279,630 B1 | 8/2001 | Herbert |
| 6,286,572 B1 * | 9/2001 | Chen .............................. 152/84 |
| 6,615,885 B1 | 9/2003 | Ohm |
| 7,201,194 B2 | 4/2007 | Rhyne et al. |
| 7,264,447 B2 | 9/2007 | Ono et al. |

* cited by examiner

NON-PNEUMATIC WHEEL ASSEMBLY WITH REMOVABLE HUB

FIELD OF THE INVENTION

The present invention relates to a non-pneumatic wheel assembly and, more particularly, to a non-pneumatic wheel assembly having a removable hub whereby the hub may be reused and the non-pneumatic wheel replaced as needed.

BACKGROUND OF THE INVENTION

Non-pneumatic tires and wheels have been disclosed. By way of example, U.S. Pat. No. 7,201,194, which is incorporated herein by reference, describes a non-pneumatic tire. In an exemplary embodiment, this non-pneumatic tire includes an outer annular shear band and a plurality of web spokes that extend transversely across and radially inward from the annular band and are connected to a hub. In certain exemplary embodiments, the annular shear band may further comprise a shear layer, at least a first membrane adhered to the radially inward extent of the shear layer and at least a second membrane adhered to the radially outward extent of the shear layer. Under load, the annular band deforms in the contact area with the ground surface through a mechanism that includes shear deformation of the annular band. In addition to the ability to operate without a required inflation pressure, the invention of U.S. Pat. No. 7,201,194 provides advantages that include a more uniform ground contact pressure throughout the length of the contact area, which in turn provides performance characteristics similar to a pneumatic tire without certain drawbacks of prior non-pneumatic tires.

For non-pneumatic constructions such as e.g., the invention described in U.S. Pat. No. 7,201,194, the web spokes transmit tension forces between the hub and outer annular band. The outer annular band supports a tread portion. By way of example, the web spokes and tread portion can be constructed from rubber and/or polymer materials that, in certain applications, may wear or be damaged during the lifetime of the wheel. For constructions where the web spokes or tread portion are permanently attached to the hub or integrated permanently into a structure that includes the hub, replacement of the web spokes and/or tread portion can require discarding the hub as well when the hub would otherwise by reusable. In addition, for certain applications it may be desirable to manufacture the hub from a different material than used in the construction of the web spokes including e.g., a metal construction for the hub and a polymeric construction for the web spokes. In such case, integral attachment of the hub and the web spokes may be not be practical or would be undesirable.

Accordingly, non-pneumatic wheel having a removable hub portion would be useful. A non-pneumatic wheel assembly having a removable hub portion that may be reused and/or constructed from a different material than the web spokes or other portions of the wheel would be particularly useful. These and other advantages of the present invention will be apparent from the description that follows.

SUMMARY OF THE INVENTION

Objects and advantages of the invention will be set forth in part in the following description, or may be apparent from the description, or may be learned through practice of the invention.

In one exemplary embodiment of the present invention, a non-pneumatic wheel assembly defining axial and radial directions is provided. The wheel assembly includes an outer annular band providing a load bearing surface. A plurality of web elements are included for supporting in tension a load applied to the wheel. The web elements extend axially across and radially inward from the outer annual band. A plurality of intersections are integrally formed by the joining of adjacent pairs of the plurality of web elements along their radially innermost portion. A hub is centrally located within the outer annular band and is removably connected to the plurality of web elements.

Variations of this exemplary embodiment provide still other embodiments of the present invention. The intersections may include a plurality of seats with each seat defined by one of the intersections. Each seat is located along a radially outward side of one of the intersections. The hub may include a plurality of pins projecting along the axial direction from the hub. Each of the pins is removably received onto one of the seats defined by the plurality of intersections.

Alternatively, the intersections may define a plurality of groove pairs where each groove pair is defined by one of the intersections. Each such groove pair is positioned on opposing sides of the intersection. The hub may include a plurality of tongues projecting along the axial direction from the hub. The plurality of tongues are removably received in complementary fashion into the plurality of groove pairs.

In another alternative embodiment, the intersections may include a plurality of cylinders oriented longitudinally along the axial direction with each cylinder fowled integrally with a radially innermost portion of one of the plurality of intersections. The hub may then include a plurality of pins projecting along the axial direction from the hub. Each of the pins is removably received into the plurality of cylinders.

In still another alternative embodiment, the intersections may include a plurality of groove pairs with at least two groove pairs being defined by each of the intersections. Each groove pair is positioned on opposing sides of the intersection. In such case, the hub may include a plurality of tongues projecting along the axial direction from the hub. The plurality of tongues are removably received in complementary fashion into the plurality of groove pairs.

In each of the exemplary embodiments set forth above, the hub is removably attached. This feature allows for replacement of other portions of the wheel assembly. In addition, because the hub is not integrally formed with other portions of the wheel assembly, the hub may be constructed of one or more different materials than used with the other parts of the wheel assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1C shows an end view of the assembled non-pneumatic wheel while FIG. 1B shows the opposite end view without a retaining ring for purposes of illustrating certain features of the present invention.

DETAILED DESCRIPTION

Figure 1A:
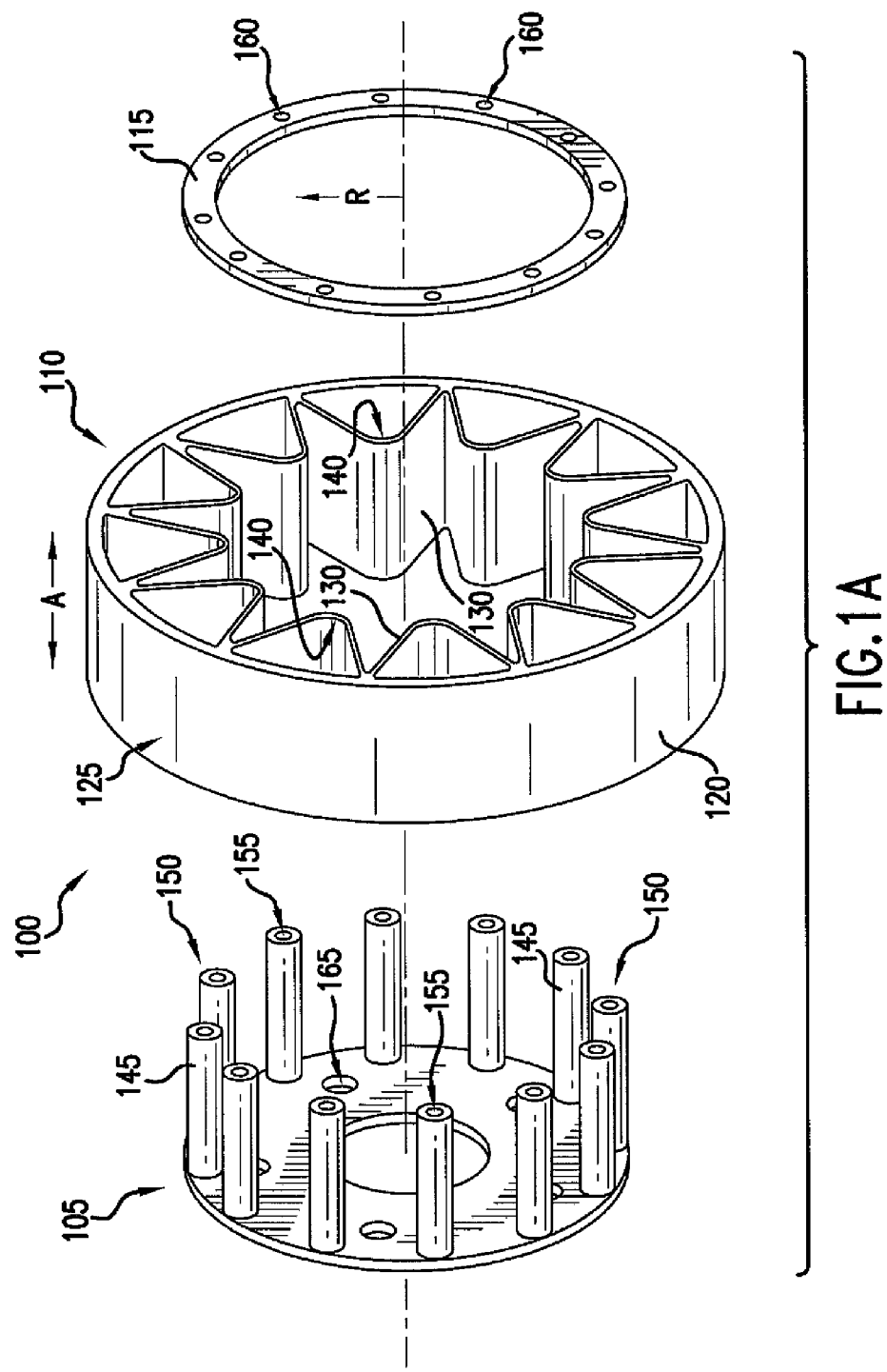
FIG. 1A illustrates an exploded view of an exemplary embodiment of the present invention.

The present invention relates to a non-pneumatic wheel and, more particularly, to a non-pneumatic wheel having a removable hub attachment whereby the hub may be reused and the remaining portion of the non-pneumatic wheel replaced as needed. For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents. In the description that follows, the use of same or similar reference numerals identifies the same or analogous features.

Figure 1B:
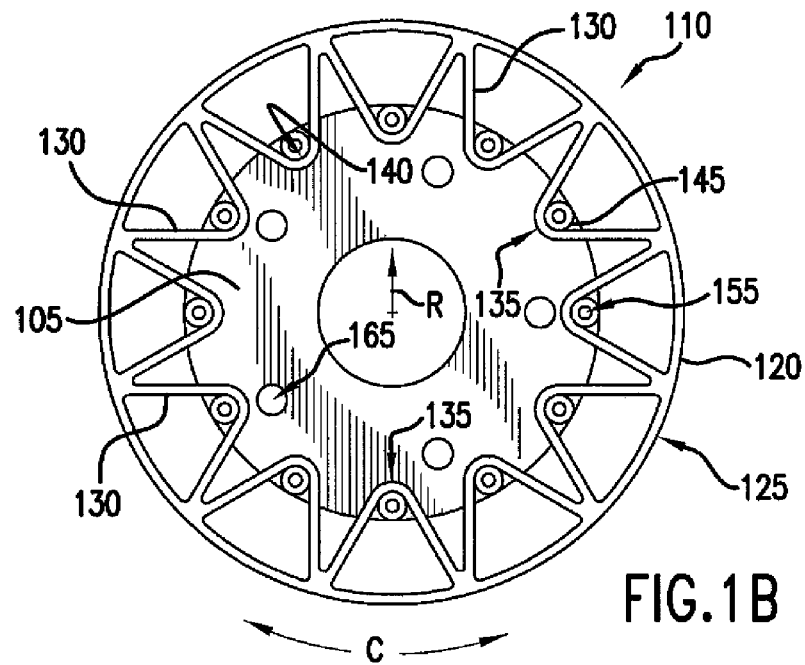
FIG. 1B and FIG. 1C represent opposing side views of the exemplary embodiment of FIG. 1A.
Figure 1C:
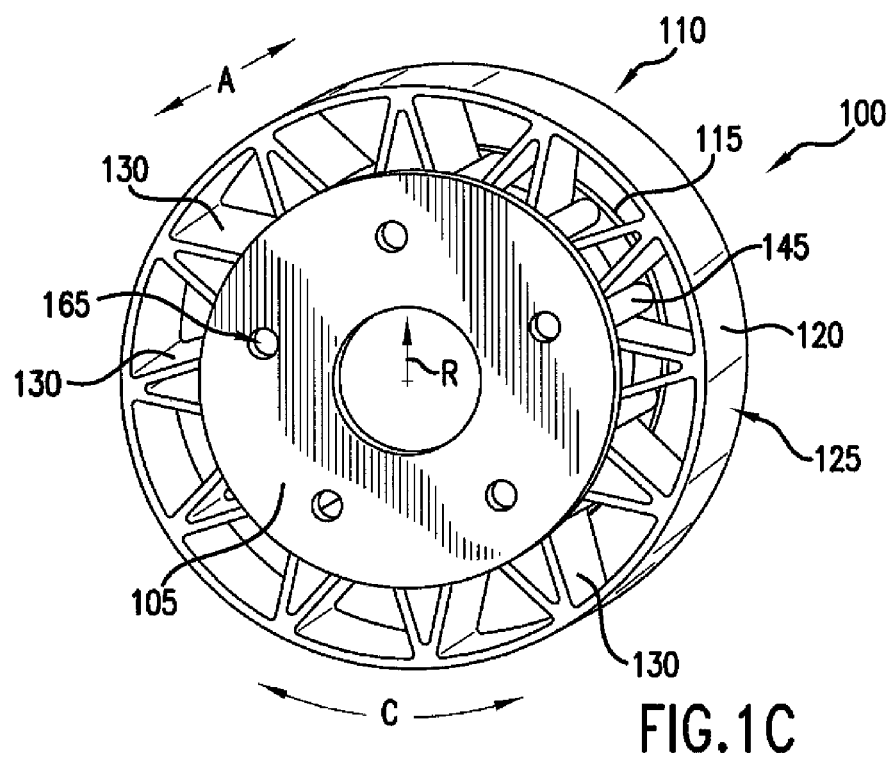

FIGS. 1A through 1C illustrate an exemplary embodiment of a non-pneumatic wheel assembly 100 of the present invention. FIG. 1A provides an exploded view while FIG. 1B and FIG. 1C provide opposite end views of non-pneumatic wheel assembly 100. The non-pneumatic wheel assembly 100 includes a hub 105, non-pneumatic wheel 110, and a retaining ring 115.

Non-pneumatic wheel 110 is constructed with an outer annular band 120 that provides a load bearing surface 125. For example, load bearing surface 125 may provide the ground contacting portion of wheel 110 or surface 125 may be equipped with a tread portion if desired. Outer annular band 120 may also include a shear band as described e.g., in U.S. Pat. No. 7,201,194. For example, the shear band may include a shear layer, at least a first membrane adhered to the radially inward extent of the shear layer and at least a second membrane adhered to the radially outward extent of the shear layer. Under load, the annular band deforms in the contact area with the ground surface through a mechanism that includes shear deformation of the annular band.

Non-pneumatic wheel assembly 100 also includes a plurality of web elements 130 for supporting in tension the load applied to wheel assembly 100. As shown in each of the figures, the web elements 130 extend inward along radial direction R. As also shown, each web element 130 is oriented at an angle from radial direction R, and other angles may be used as well. Each web element 130 also extends axially across the width of outer annular band 120. More specifically, each web element 130 has the same width along the axial direction A as the outer annular band 120, and other widths may also be applied within the scope of the present invention.

As best shown in FIG. 1B, at their radially innermost portion, adjacent pairs of web elements 130 are joined to form intersections 135, which are uniformly spaced about the circumferential direction C of wheel 210. Each intersection 135 provides a seat 140 along the radially outermost side of intersection 135. For this exemplary embodiment of wheel 210, seat 140 is circular in shape.

Once assembled, hub 105 is centrally located within outer annular band 120 and is removably connected to the web elements 130. More specifically, hub 105 includes a plurality of pins 145 projecting along the axial direction A (FIG. 1A) from the hub 105. Each of the pins 145 is removably received onto one of the seats 140 defined by the intersections 135. The circular shape of each seat 140 is similar to the cylindrical shape of each pin 145. During operation, as wheel 110 rolls along the ground, pins 145 are able to slide relative to seats 140. This freedom of movement may be particularly desirable for certain applications.

As shown in FIG. 1A, each pin 145 includes a connecting end 150. To secure non-pneumatic wheel 110 to hub 105, retaining ring 115 is removably attached to the connecting ends 150 of pins 145. For example, mechanical fasteners such as bolts may be inserted through apertures 160 of retaining ring 115 and connected into threaded apertures 155 of hub 105. Apertures 165 provide for connection of hub 105 to e.g., a vehicle.

Importantly, hub 105 is not formed as an integral part of non-pneumatic wheel 110. Accordingly, in the event wheel 110 is damaged or replacement is otherwise desired, non-pneumatic assembly 100 provides for the removal of wheel 110 from hub 105. In addition, if desired, hub 105 can be readily constructed from a different material than wheel 110. For example, it may be desirable to manufacture hub 105 from a metal and manufacture wheel 100 from a urethane material, and the present invention provides for such constructions.

Figure 2A:
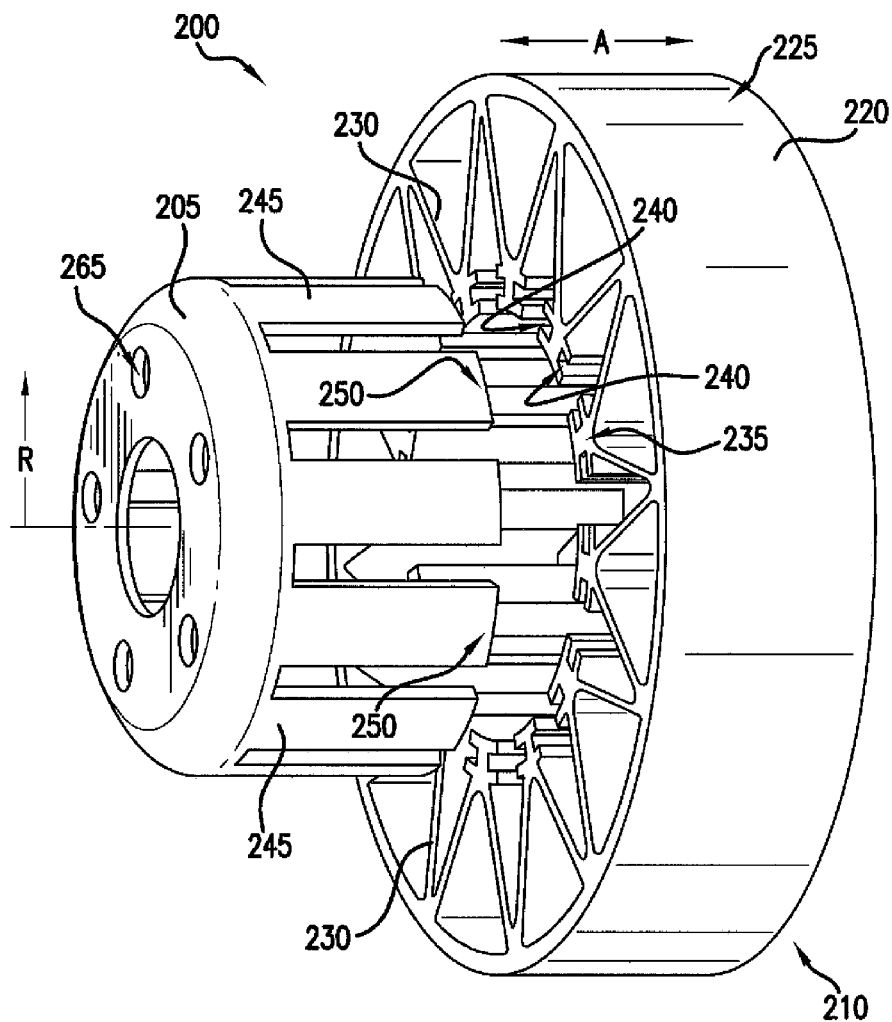
FIG. 2A provides an exploded view of another exemplary embodiment of the present invention.
Figure 2B:
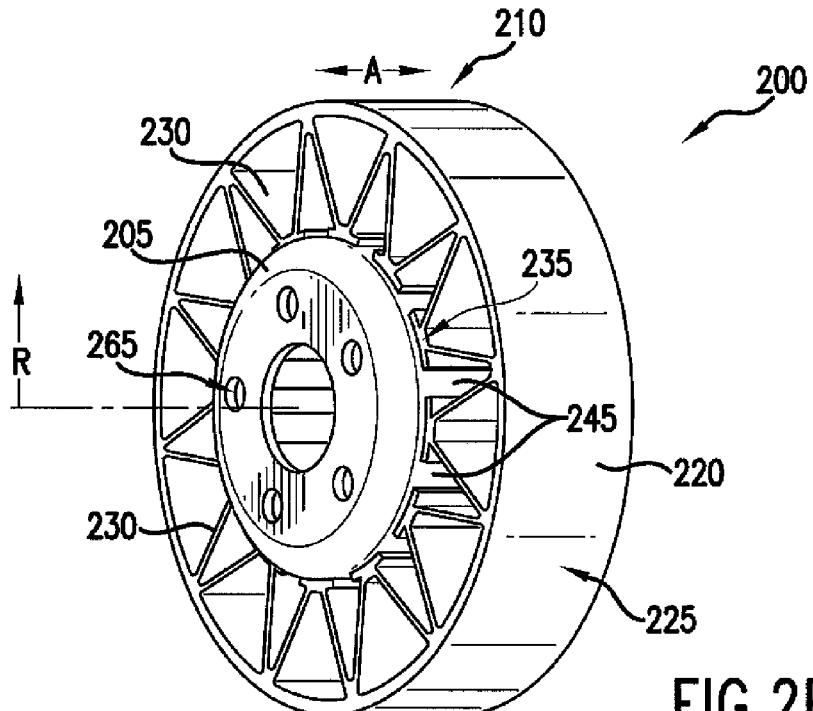
FIG. 2B provides a perspective view of the exemplary embodiment of FIG. 2A in assembled form.
Figure 2C:
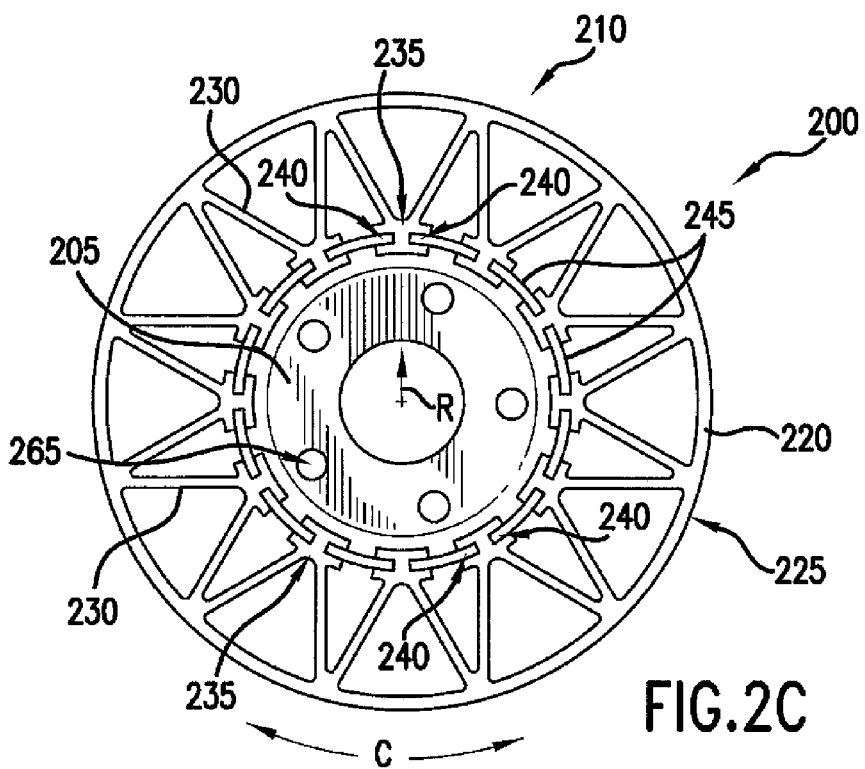
FIG. 2C provides an end view of the exemplary embodiment of FIG. 2A albeit without a retaining ring as will be described below.

FIGS. 2A through 2C illustrate another exemplary embodiment of a non-pneumatic wheel assembly 200 according to the present invention. The non-pneumatic wheel assembly 200 includes a hub 205 and non-pneumatic wheel 210. A retaining ring similar to ring 115 is used to secure wheel 210 to hub 205 in a manner similar to that previously described with wheel assembly 100 and is not shown in the figures for purposes of clarity in illustrating certain other features of the invention.

Non-pneumatic wheel 210 is constructed with an outer annular band 220 that provides a load bearing surface 225. For example, load bearing surface 225 may provide the ground contacting portion of wheel 210 or surface 225 may be equipped with a tread portion if desired. Outer annular band 220 may also include a shear band as previously described.

Non-pneumatic wheel assembly 200 also includes a plurality of web elements 230 for supporting in tension the load applied to wheel assembly 200. As shown in each of the figures, the web elements 230 extend inward along radial direction R. Each element 230 is oriented at an angle from radial direction R, and other angles may be used. Each web element 230 also extends axially across the width of outer annular band 220—i.e., each web element 230 has the same width along the axial direction A as the outer annular band 220. However, other widths may also be applied within the scope of the present invention.

As best shown in FIG. 2C, at their radially innermost portion, adjacent pairs of web elements 230 are joined to form intersections 235, which are uniformly spaced about the circumferential direction C of wheel 210. Each intersection 235 defines a pair of grooves 240, and each intersection 235 includes a groove 240 positioned on circumferentially opposing sides of the intersection 235.

Hub 205 is centrally located within outer annular band 220 and is removably connected to the web elements 230. More specifically, hub 205 includes a plurality of tongues 245 (FIG. 2A) projecting along axial direction A from hub 205. Tongues 245 are removably received in complementary fashion into the groove pairs 240. Referring to FIG. 2C, each tongue 245 slides into grooves 240 provided by two different intersections 235 that are adjacent along the circumferential direction C. Compared to the exemplary embodiment of FIGS. 1A-1C, non-pneumatic wheel assembly 200 provides a more rigid connection between hub 205 and wheel 210.

As shown in FIG. 2A, each tongue pin 245 includes a connecting end 250. To secure non-pneumatic wheel 210 to hub 205, a retaining ring (not shown) can be removably attached to the connecting ends 250 of tongues 245 using e.g., mechanical fasteners as previously described. Again, as indicated for the embodiment of FIGS. 1A-1C, hub 205 is not formed as an integral part of wheel 210. Apertures 265 allow for connection to a vehicle.

Accordingly, in the event wheel 210 is damaged or replacement is otherwise desired, non-pneumatic assembly 200 provides for the removal of wheel 210 from hub 205. As with the embodiment of wheel 100, hub 205 can be readily constructed from a different material than wheel 210.

Figure 3A:
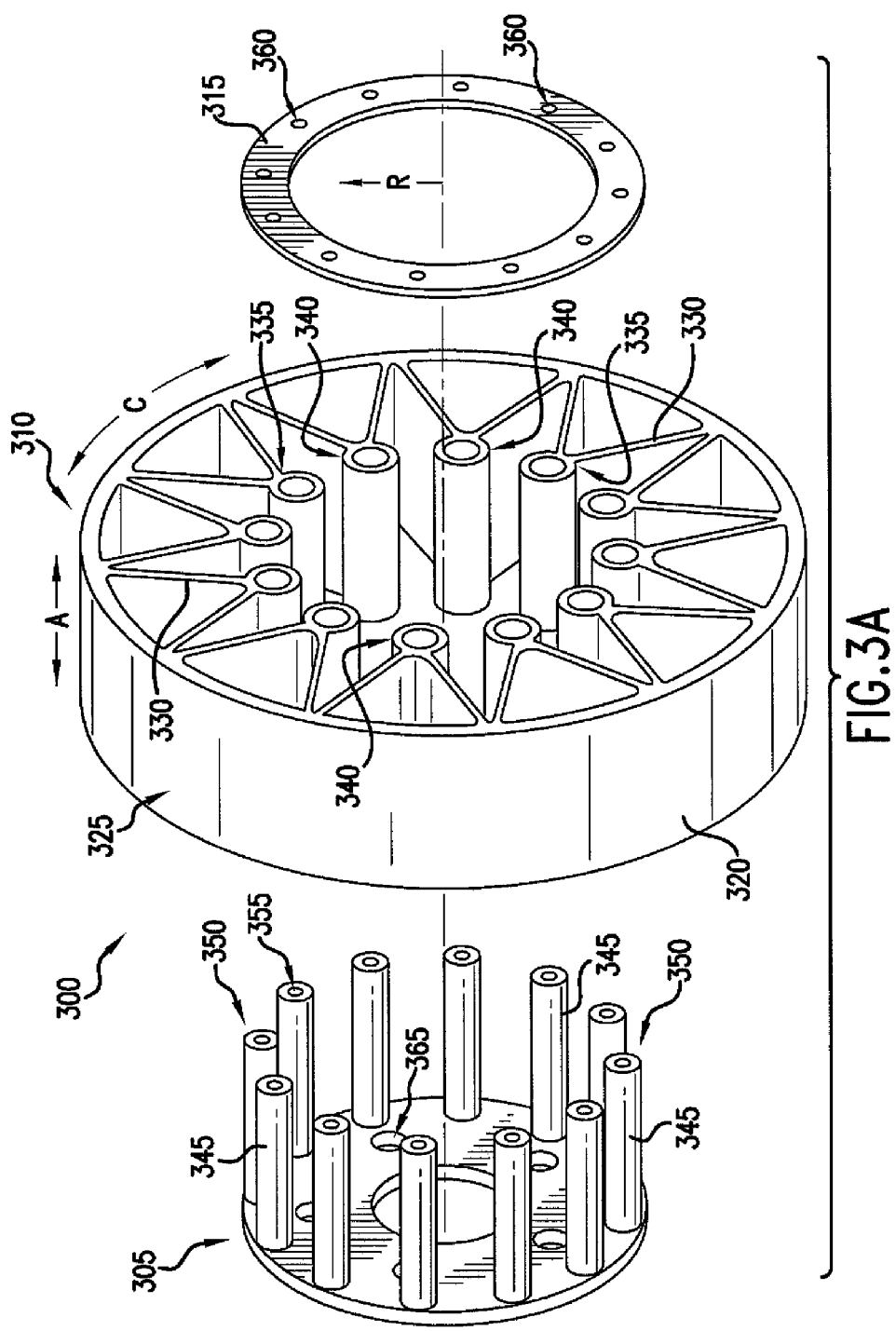
FIG. 3A illustrates an exploded view of another exemplary embodiment of the present invention.
Figure 3B:
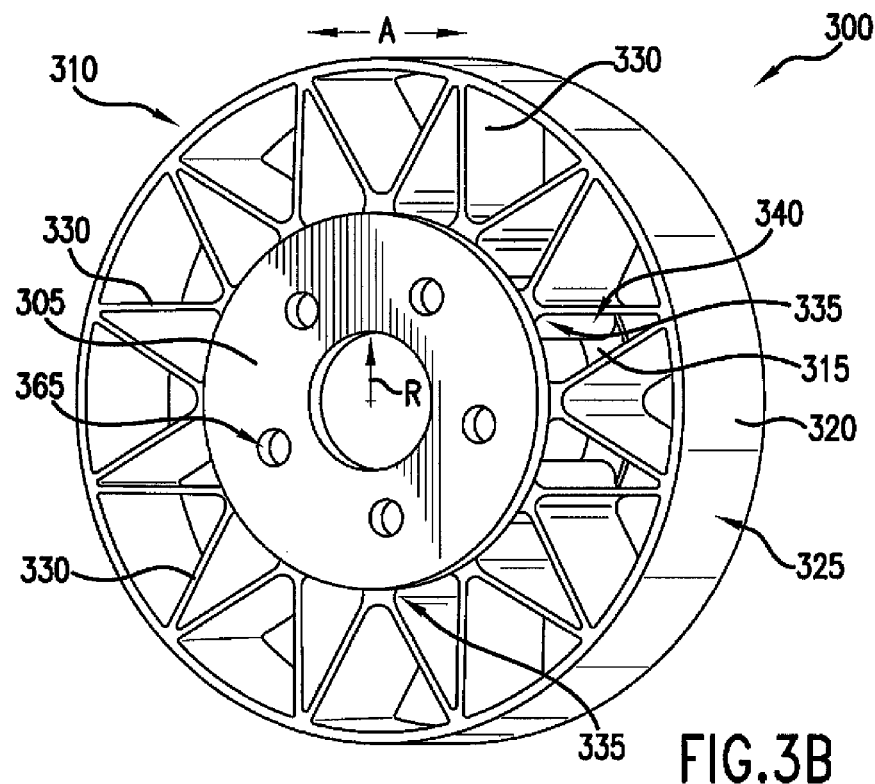
FIG. 3B provides a perspective view and FIG. 3C provides an end view of the assembled exemplary embodiment of FIG. 3A.
Figure 3C:
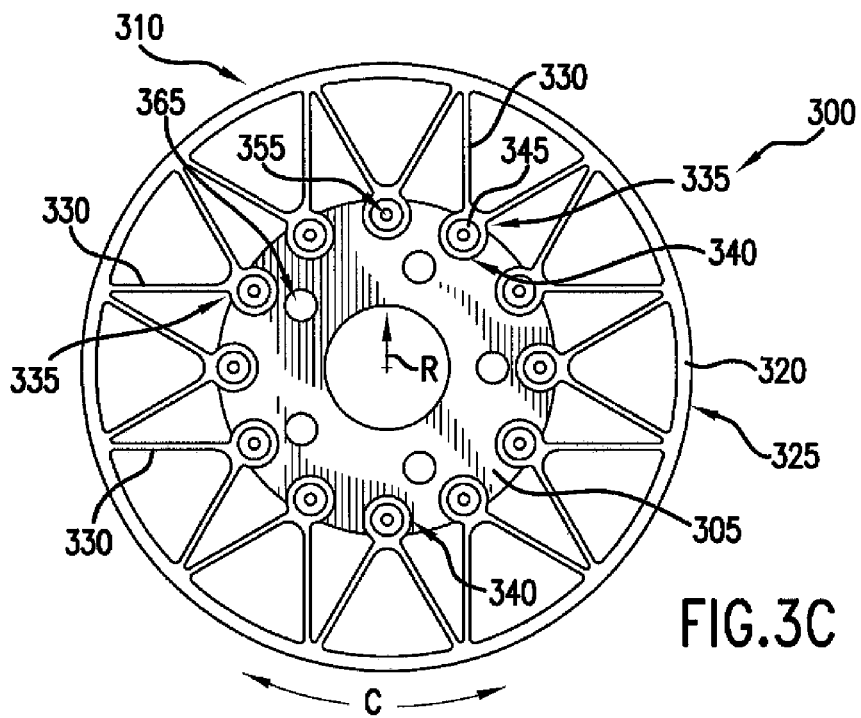

Turning now to FIGS. 3A through 3C, another exemplary embodiment of the present invention is provided in non-pneumatic wheel assembly 300. In a manner similar to the previously described embodiments, wheel assembly 300 is constructed from hub 305, non-pneumatic wheel 310, and retaining ring 315 with features similar to the previously described embodiments. However, wheel assembly 300 differs from the previously described embodiments by the manner in which hub 305 is removably connected with wheel 310.

More specifically, adjacent pairs of web elements 330 each are each joined at an intersection 335 as previously described. At the radially innermost portion of each intersection 335, however, a cylinder 340 is integrally formed with the intersection 335 and oriented longitudinally along the axial direction A. Hub 305 includes a plurality of pins 345 projecting along the axial direction A from hub 305. Each of the pins 345 is removably received into one of the cylinders 340. Retaining ring 315 may be fastened to hub 305 using apertures 355, 360 and mechanical fasteners as previously described. Again, because wheel 310 is removably connected to hub 305, wheel 310 may be readily replaced while hub 305 is reused, and wheel 310 and hub 305 may be constructed of different materials. In a manner similar to non-pneumatic wheel assembly 100, cylinders 340 are slidable with respect to pins 345. A less rigid connection between the hub and wheel may be more desirable for certain applications.

Figure 4A:
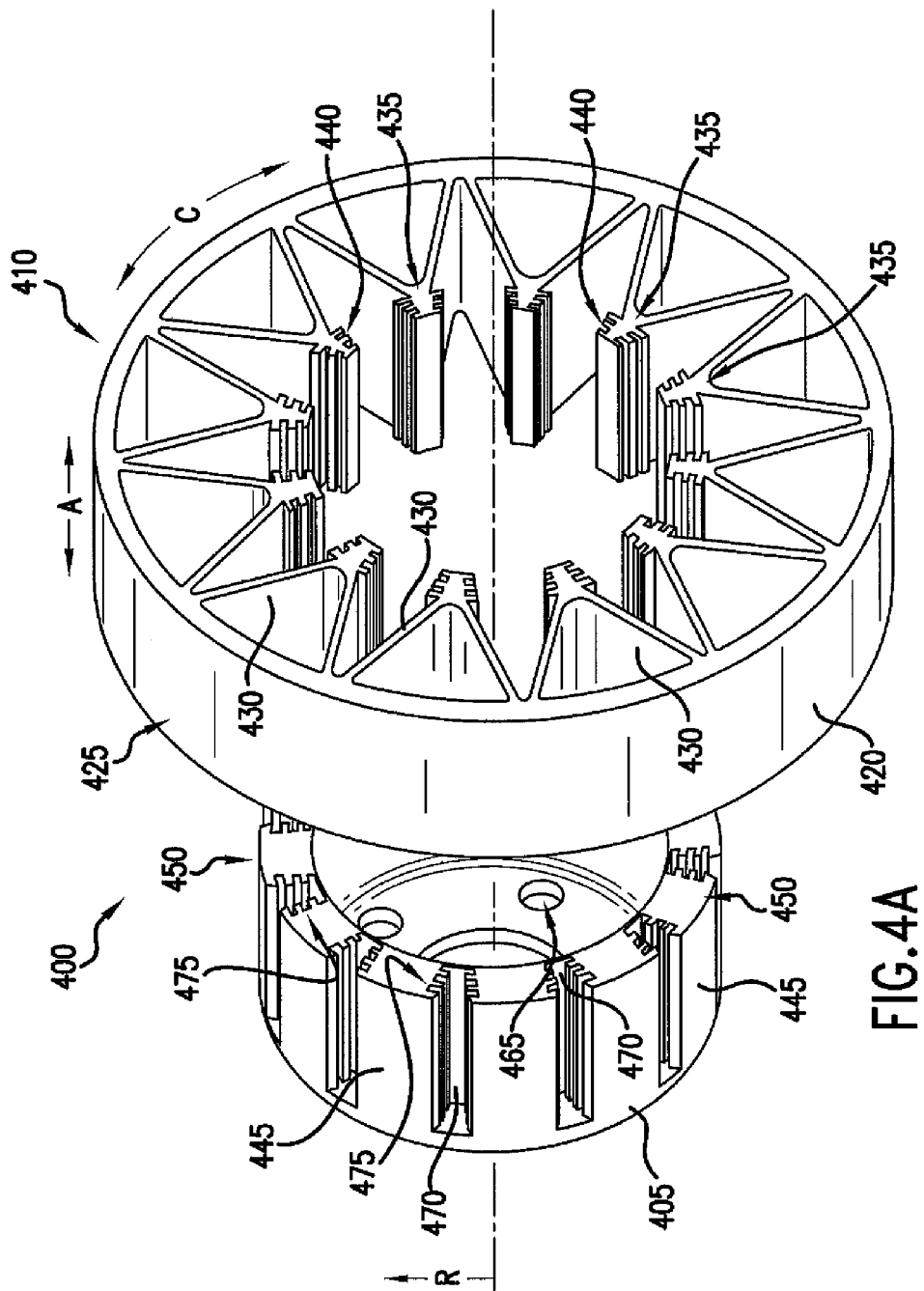
FIG. 4A illustrates an exploded view of another exemplary embodiment of the present invention.
Figure 4B:
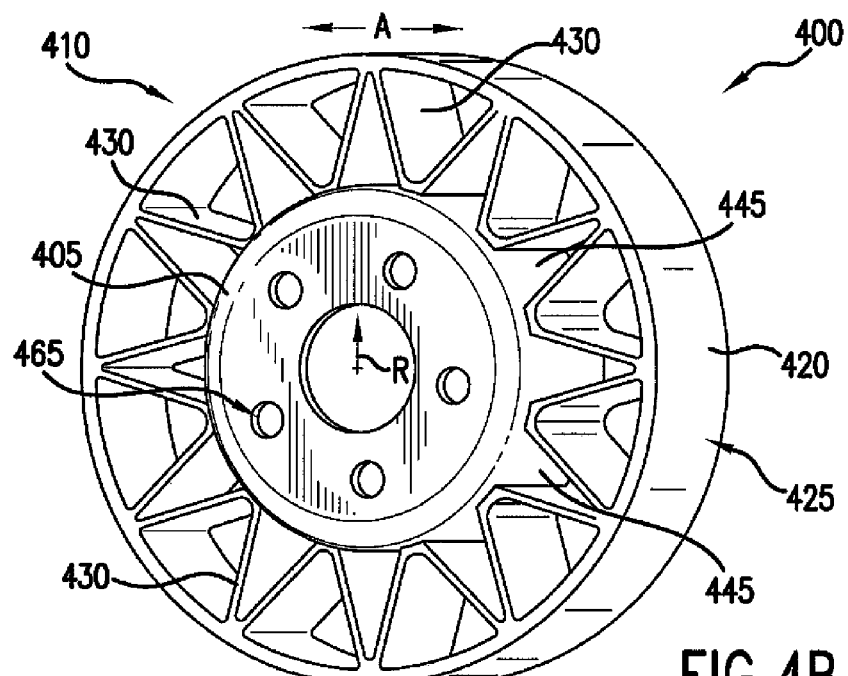
FIG. 4B provides a perspective view and FIG. 4C provides an end view of the assembled exemplary embodiment of FIG. 4A albeit without a retaining ring as will be described below.
Figure 4C:
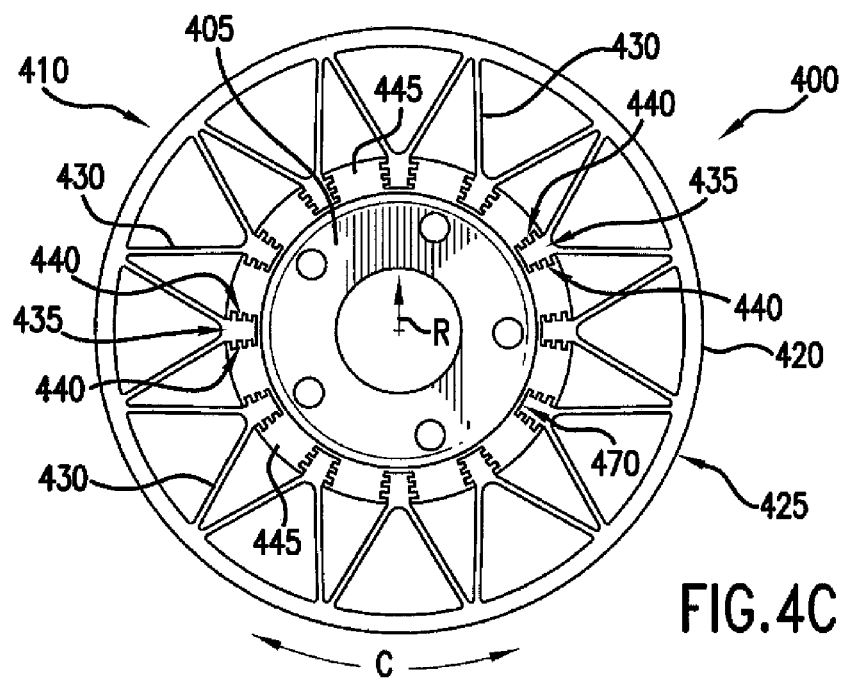

FIGS. 4A through 4C provide still another exemplary embodiment of the present invention with non-pneumatic wheel assembly 400. As with previous embodiments, wheel assembly 400 includes a hub 405, non-pneumatic wheel 410, and a retaining ring. For purposes of illustrating other features of the invention, the retaining ring is not shown. However, such a retaining ring would removably connect e.g., to threaded apertures in the connecting end 450 of tongues 445 in a manner as previously described.

Wheel 410 includes multiple of intersections 435 formed by the joining of adjacent pairs of web elements 430 at their radially innermost portion. Intersections 435 are uniformly spaced along the circumferential direction C of wheel 410. Each of the intersections 435 defines at least two pairs of grooves 440 with each groove 440 positioned on circumferentially opposing sides of the intersection 435.

Hub 405 includes a plurality of tongues 445 projecting along the axial direction A from the hub 405. Tongues 445 are removably received in complementary fashion into the pairs of grooves 440 defined by intersections 435. More particularly, tongues 445 also define multiple grooves 475 located on each side of tongue 445 and configured for complementary or mating receipt with grooves 440. Hub 405 also includes an inner annular band 470 extending between the tongues 445 and connected to a radially innermost portion of each of tongues 445.

Accordingly, as with previous exemplary embodiments, non-pneumatic wheel assembly 400 provides for the removal or separation of wheel 410 from hub 405. In addition, the use of multiple grooves 440 along intersections 435 and tongues 445 provides a more rigid connected between hub 405 and wheel 410 that may be preferred for certain applications.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A non-pneumatic wheel assembly defining axial and radial directions, comprising:
    an outer annular band providing a load bearing surface;
    a plurality of web elements for supporting in tension a load applied to the wheel, said web elements extending axially across and radially inward from said outer annual band;
    a plurality of intersections integrally formed by the joining of adjacent pairs of said plurality of web elements along their radially innermost portion;
    a hub centrally located within said outer annular band and removably connected to said plurality of web elements;
    a plurality of cylinders of unitary construction oriented longitudinally along the axial direction, each cylinder formed integrally with a radially innermost portion of one of said plurality of intersections; and
    a plurality of pins projecting along the axial direction from said hub, each of said pins removably received into said plurality of cylinders.

2. A non-pneumatic wheel assembly as in claim 1, wherein said plurality of pins each comprise a connecting end, and wherein the non-pneumatic wheel further comprises a retaining ring removably attached to the connecting ends of said plurality of pins.

3. A non-pneumatic wheel assembly as in claim 2, wherein said plurality of web elements define a width along the axial direction, and wherein said plurality of pins extend axially across the entire width of said plurality of web elements.

4. A non-pneumatic wheel assembly as in claim 1, wherein each of said plurality of cylinders is slidable about a respective said pin.

5. A non-pneumatic wheel assembly as in claim 1, wherein said outer annular band further comprises a shear band.

* * * * *